US011343112B2

(12) United States Patent
Senoo et al.

(10) Patent No.: US 11,343,112 B2
(45) Date of Patent: May 24, 2022

(54) MULTICAST TRANSFER SYSTEM AND MULTICAST TRANSFER METHOD

(71) Applicant: Nippon Telegraph and Telephone Corporation, Tokyo (JP)

(72) Inventors: Ryuma Senoo, Musashino (JP); Ken Takahashi, Musashino (JP); Shigemasa Kumagawa, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 45 days.

(21) Appl. No.: 16/970,545

(22) PCT Filed: Feb. 20, 2019

(86) PCT No.: PCT/JP2019/006299
§ 371 (c)(1),
(2) Date: Aug. 17, 2020

(87) PCT Pub. No.: WO2019/163819
PCT Pub. Date: Aug. 29, 2019

(65) Prior Publication Data
US 2021/0111913 A1      Apr. 15, 2021

(30) Foreign Application Priority Data
Feb. 23, 2018  (JP) .............................. JP2018-030429

(51) Int. Cl.
*H04L 12/18* (2006.01)
*H04L 12/761* (2013.01)
*H04L 45/16* (2022.01)
(52) U.S. Cl.
CPC .............. *H04L 12/18* (2013.01); *H04L 45/16* (2013.01)

(58) Field of Classification Search
None
See application file for complete search history.

(56) References Cited

U.S. PATENT DOCUMENTS

2019/0116053 A1\*  4/2019  Allan ................... H04L 12/4633
2019/0245779 A1\*  8/2019  Jonnalagadda ..... H04L 12/4641

FOREIGN PATENT DOCUMENTS

JP          2004-80434         3/2004

OTHER PUBLICATIONS

Allan et al., "A Framework for Computed Multicast applied to MPLS based Segment Routing," SPRING Working Group, Apr. 2017, 14 pages.

\* cited by examiner

*Primary Examiner* — Hong Shao
(74) *Attorney, Agent, or Firm* — Fish & Richardson P.C.

(57) ABSTRACT

Implementations are directed to performing path switching quickly and efficiently when path switching is required in a multicast transfer system. In a multicast transfer system, a multicast group for transmitting the same packet from a sender (transmitting apparatus) to a plurality of receivers (receiving apparatuses) is formed. A transfer apparatus holds transfer destination data in which a group identifier for identifying a multicast group is associated with copy transfer destination information (multicast segment) for specifying another transfer apparatus to be used as a packet transfer destination when the packet is received. In copy transfer destination information, a plurality of other transfer apparatuses can be registered by adding a priority, and a plurality of group identifiers can be associated with a single piece of copy transfer destination information.

6 Claims, 10 Drawing Sheets

| MULTICAST GROUP IDENTIFIER | Multicast Segment IDENTIFIER |
|---|---|
| IDENTIFIER 52 | IDENTIFIER 73 |

93a

| Multicast Segment IDENTIFIER | COPY TRANSFER DESTINATION | |
|---|---|---|
| | NORMAL SYSTEM | STANDBY SYSTEM |
| IDENTIFIER 73 | IDENTIFIER 65 | — |
| | IDENTIFIER 66 | — |

| MULTICAST GROUP IDENTIFIER | Multicast Segment IDENTIFIER |
|---|---|
| IDENTIFIER 52 | IDENTIFIER 73 |
| IDENTIFIER 51 | IDENTIFIER 73 |

| Multicast Segment IDENTIFIER | COPY TRANSFER DESTINATION | |
|---|---|---|
| | NORMAL SYSTEM | STANDBY SYSTEM |
| IDENTIFIER 73 | IDENTIFIER 65 | — |
| | IDENTIFIER 66 | — |

Fig. 8

MULTICAST TRANSFER SYSTEM AND MULTICAST TRANSFER METHOD

CROSS-REFERENCE TO RELATED APPLICATIONS

This application is a National Stage application under 35 U.S.C. § 371 of International Application No. PCT/JP2019/006299, having an International Filing Date of Feb. 20, 2019, which claims priority to Japanese Application Serial No. 2018-030429, filed on Feb. 23, 2018. The disclosure of the prior application is considered part of the disclosure of this application, and is incorporated in its entirety into this application.

TECHNICAL FIELD

The present disclosure relates to a multicast transfer system and a multicast transfer method for performing multicast transfer of packets in a network.

BACKGROUND ART

In the related art, when information (hereinafter, referred to as a "packet") is transferred from a sender (transmitting apparatus) to a receiver (receiving apparatus) in a network, a packet is transferred based on destination information (hereinafter, referred to as "header information") or the like described in the packet in a transfer apparatus configuring the network. Segment Routing (SR) is mentioned as a path control protocol that has recently attracted attention. In segment routing, identifiers are assigned to transfer apparatuses and these identifiers are written in header information to explicitly designate a passage path of the packet, thereby enabling efficient use of the network.

Here, a situation in which a sender transfers (hereinafter, referred to as "multicast transfer") the same packet to a plurality of destinations (receivers) using segment routing will be considered.

As a method for managing information used for multicast transfer using segment routing, a method of preparing a multicast group identifier and a multicast segment identifier and managing the identifiers in association with each other is considered promising.

The multicast group identifier is an identifier for identifying a combination (hereinafter, referred to as "multicast group") of a sender and a receiver in the multicast transfer. The multicast segment identifier is an identifier for identifying a copy transfer destination (hereinafter, referred to as a "multicast segment") of the packet.

Multicast transfer using segment routing is performed while referring to information designated by the multicast group identifier and the multicast segment identifier, and the association between these identifiers.

A path between the transfer apparatuses when performing the multicast transfer is set to pass through the shortest path between the transfer apparatuses. This path is computed by a separate program (Inter-Gateway Protocol, hereinafter referred to as "IGP").

Here, when a failure or the like occurs in some of the transfer apparatuses in the network in which the multicast transfer is performed, a transfer destination is switched so that the packet is copied and transferred avoiding the transfer apparatus in which the failure or the like has occurred.

For example, a transfer apparatus for which avoidance of copying and transferring due to a failure or the like is to be desired is referred to as a "switching source node", a transfer apparatus which is a copy transfer destination from the switching source node is referred to as a "downstream node", and a transfer apparatus which performs copying and transferring to the switching source node is referred to as an "upstream node".

In the related art, when it is desired to avoid the switching source node, a method of switching (re-registering) the copy transfer destination from the upstream node to the downstream node from the switching source node is adopted.

CITATION LIST

Non Patent Literature

Non Patent Literature 1: Dave Allan, "A Framework for Computed Multicast applied to MPLS based Segment Routing," [online], April 2017, [searched on Feb. 14, 2018], Internet<URL:https://tools.ietf.org/pdf/draft-allan-spring-mpls-multicast-framework-03.pdf>

SUMMARY OF THE INVENTION

Technical Problem

In the related art described above, a switching source node exists on the shortest path between the upstream node and the downstream node and thus, even if a copy transfer destination is updated in the upstream node, multicast transfer cannot be performed until re-computation of a path from which the switching source node has been removed by IGP is completed. Therefore, there is a problem that the recovery of communication in the multicast transfer depends on IGP path re-computation.

Copying and transferring of the packet is performed at the upstream node, and thus there is a problem that a duplicate packet is circulated in the network and bandwidth consumption in the network is increased.

The present disclosure has been made in view of such circumstances, and an object of the present disclosure is to quickly and efficiently switch paths when a packet transfer path needs to be switched in a multicast transfer system.

Means for Solving the Problem

In order to achieve the object described above, a disclosure described in claim 1 is a multicast transfer system including a transmitting apparatus configured to transmit a packet; a receiving apparatus configured to receive the packet; and a plurality of transfer apparatuses that are disposed between the transmitting apparatus and the receiving apparatus and transfer the packet, a multicast group for transmitting the same packet from a single transmitting apparatus to a plurality of the receiving apparatuses being formed in the multicast transfer system, in which each of the transfer apparatuses holds transfer destination data that associates a group identifier for identifying the multicast group with copy transfer destination information that specifies another transfer apparatus to be used as a transfer destination of the packet when the packet is received, and, in the copy transfer destination information, a plurality of the other transfer apparatuses are allowed to be registered by adding a priority and a plurality of the group identifiers are allowed to be associated with a single piece of the copy transfer destination information.

A disclosure includes a multicast transfer method in a multicast transfer method in a multicast transfer system including a transmitting apparatus configured to transmit a packet, a receiving apparatus configured to receive the packet, and a plurality of transfer apparatuses that are disposed between the transmitting apparatus and the receiving apparatus and transfer the packet, a multicast group for transmitting the same packet from a single transmitting apparatus to a plurality of the receiving apparatuses being formed in the multicast transfer system, which includes, by each of the transfer apparatuses, holding transfer destination data that associates a group identifier for identifying the multicast group with copy transfer destination information that specifies another transfer apparatus to be used as a transfer destination of the packet when the packet is received, and, in the copy transfer destination information, allowing a plurality of the other transfer apparatuses to be registered by adding a priority and allowing a plurality of the group identifiers to be associated with a single piece of the copy transfer destination information.

In this way, the transfer apparatus to be used as a transfer destination of the packet can be switched without changing a correspondence between the copy transfer destination information and the group identifier. A plurality of group identifiers can be associated with a single piece of copy transfer destination information, and thus the computation load when setting a copy transfer destination can be reduced.

A disclosure described in claim 2 provides the multicast transfer system described in claim 1, in which each of the transfer apparatuses includes a transfer destination data calculation unit configured to calculate the transfer destination data held by the other transfer apparatus in the multicast transfer system, a transfer destination data update unit configured to newly sets a transfer apparatus to which the transfer apparatus is allowed to be connected to the copy transfer destination information of the transfer destination data of the transfer apparatus when the transfer apparatus to which the transfer apparatus is allowed to be connected is set in the copy transfer destination information of the transfer destination data held by the other transfer apparatus, and records the group identifier associated with the transfer apparatus to which the transfer apparatus is allowed to be connected in the transfer destination data held by the other transfer apparatus in association with the newly set copy transfer destination information, and a notification unit configured to notify an upstream transfer apparatus positioned upstream of the other transfer apparatus of update information of the transfer destination data including the group identifier newly recorded, and the transfer destination data update unit adds a downstream transfer apparatus positioned downstream of the transfer apparatus to the copy transfer destination information associated with the group identifier in the transfer destination data of the transfer apparatus when a notification of the update information is given from the downstream transfer apparatus.

A disclosure provides the multicast transfer method, which further includes, at each of the transfer apparatuses, executing a transfer destination data calculation for calculating the transfer destination data held by the other transfer apparatus in the multicast transfer system, executing a first transfer destination data update for newly setting a transfer apparatus to which the transfer apparatus is allowed to be connected to the copy transfer destination information of the transfer destination data of the transfer apparatus when the transfer apparatus to which the transfer apparatus is allowed to be connected is set in the copy transfer destination information of the transfer destination data held by the other transfer apparatus, and recording the group identifier associated with the transfer apparatus to which the transfer apparatus is allowed to be connected in the transfer destination data held by the other transfer apparatus in association with the newly set copy transfer destination information, and executing a notification for notifying an upstream transfer apparatus positioned upstream of the other transfer apparatus of update information of the transfer destination data including the group identifier newly recorded, and at the upstream transfer apparatus, executing a second transfer destination data update for adding a downstream transfer apparatus positioned downstream of the apparatus to the copy transfer destination information associated with the group identifier in the transfer destination data of the apparatus when a notification of the update information is given from the downstream transfer apparatus.

In this way, it is possible to make the packet transfer path redundant, and it is possible to prevent packet transfer from being delayed, for example, when a failure occurs or when a load is concentrated on a specific transfer apparatus.

A disclosure described in claim 3 provides the multicast transfer system described in claim 2, in which, when the copy transfer destination information of the transfer destination data held by the other transfer apparatus includes the same copy transfer destination information as the copy transfer destination information of the transfer destination data held by the transfer apparatus, the transfer destination data update unit records the group identifier associated with the same copy transfer destination information in the transfer destination data held by the other transfer apparatus in the same copy transfer destination information of the transfer destination data of the transfer apparatus.

A disclosure provides the multicast transfer method, in which, in the executing the first transfer destination data update, when the copy transfer destination information of the transfer destination data held by the other transfer apparatus includes the same copy transfer destination information as the copy transfer destination information of the transfer destination data held by the transfer apparatus, the transfer destination data update unit records the group identifier associated with the same copy transfer destination information in the transfer destination data held by the other transfer apparatus in the same copy transfer destination information of the transfer destination data of the transfer apparatus.

In this way, when a transfer apparatus for which the same copy transfer destination as another transfer apparatus can be set has set a copy transfer destination in advance to perform transfer in another multicast group, this computation load can be reduced by utilizing the information (multicast segment information computed in advance).

A disclosure described in claim 1 provides the multicast transfer system, in which each of the transfer apparatuses further includes, a packet transfer unit configured to, when the packet to which the group identifier is added is received, transfer the packet to a transfer apparatus having a highest priority among transfer apparatuses in the copy transfer destination information associated with the group identifier in the transfer destination data, and when a failure is detected in the transfer apparatus having the highest priority, the packet transfer unit transfers the packet to a transfer apparatus having a next highest priority among the transfer apparatuses in the copy transfer destination information, as the copy transfer destination of the packet.

A disclosure provides the multicast transfer method, which further includes, at each of the transfer apparatuses, executing a packet transfer for, when the packet is received, transferring the packet to a transfer apparatus having a highest priority among transfer apparatuses in the copy transfer destination information associated with the group identifier in the transfer destination data, in which, in the executing the packet transfer, when a failure is detected in the transfer apparatus having the highest priority, the packet is transferred to a transfer apparatus having a next highest priority among the transfer apparatuses in the copy transfer destination information, as the copy transfer destination of the packet.

In this way, even in a case where a failure occurs in the transfer apparatus on the packet transfer path, the transfer destination can be immediately switched to a preset standby system, quick failure recovery can be realized, and increase in bandwidth consumption in the network at the time of failure recovery can be suppressed.

Effects of the Invention

According to the present disclosure, when it is necessary to switch a packet transfer path in a multicast transfer system, it is possible to switch the path quickly and efficiently.

BRIEF DESCRIPTION OF DRAWINGS

FIG. 7 is a table showing another example of the transfer destination data DB4 of the transfer apparatus 44.

FIG. 8 is a table showing another example of the transfer destination data DB4 of the transfer apparatus 44.

DESCRIPTION OF EMBODIMENTS

Hereinafter, preferred embodiments of a multicast transfer system and a multicast transfer method according to the present disclosure will be described in detail with reference to the accompanying drawings.

Figure 1:
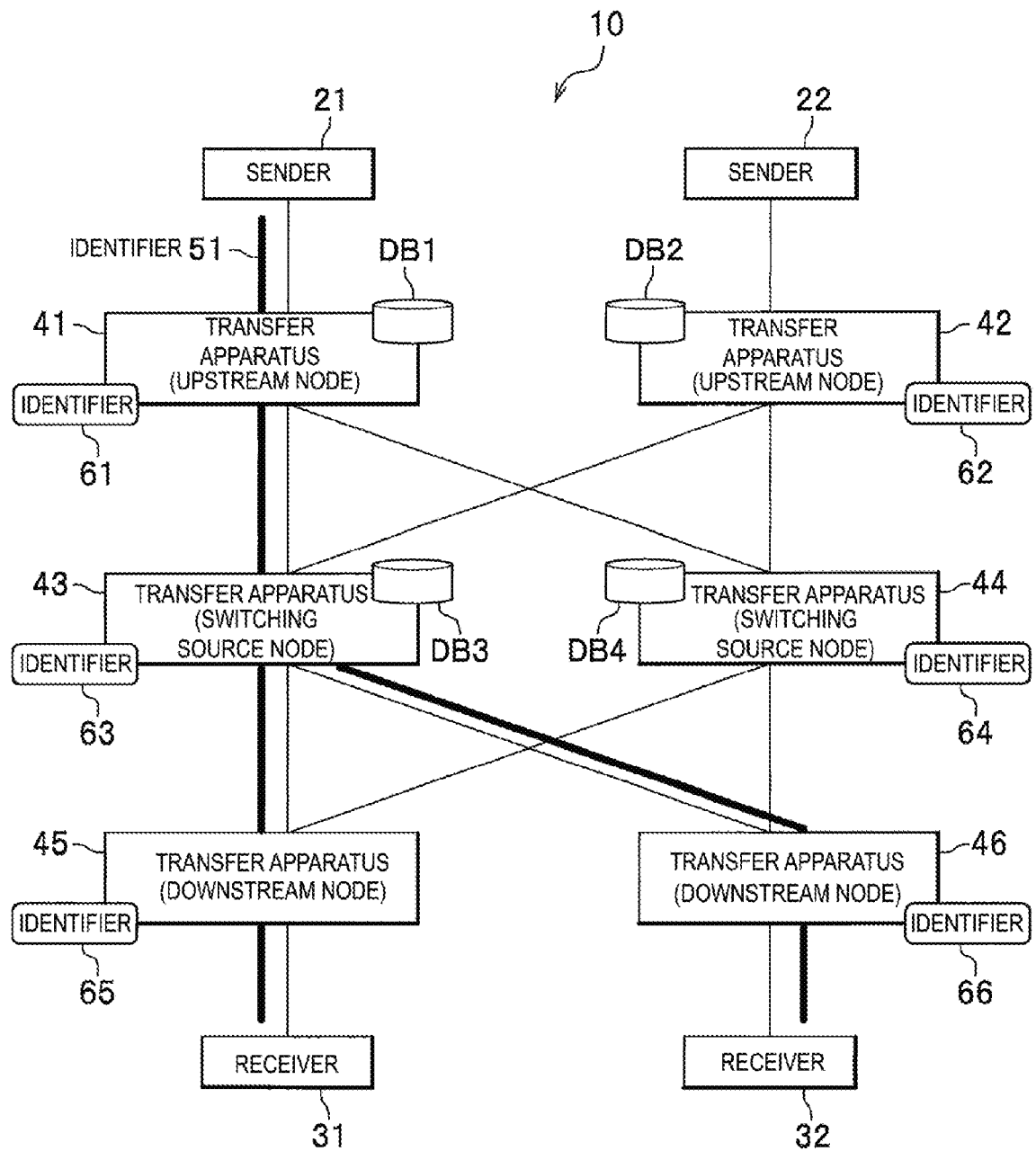
FIG. 1 is a diagram illustrating a configuration of a multicast transfer system according to an embodiment.

FIG. 1 is a diagram illustrating a configuration of a multicast transfer system 10 according to an embodiment.

The multicast transfer system 10 is configured to include senders (transmitting apparatuses) 21 and 22 for transmitting a packet, receivers (receiving apparatuses) 31 and 32 for receiving the packet, and a plurality of transfer apparatuses 41 to 46 which are disposed between the senders 21 and 22 and the receivers 31 and 32 and transfer the packet. Identifiers 61 to 66 are assigned to the transfer apparatuses 41 to 46. The numbers of the senders 21 and 22, the receivers 31 and 32, and the transfer apparatuses 41 to 46 are merely examples, and are not limited to the illustrated numbers of the senders, receivers, and transfer apparatuses.

In the multicast transfer system 10, a multicast group for transferring the same packet from a single sender to a plurality of receivers is formed. In this embodiment, as illustrated in FIG. 1, it is assumed that a first multicast group for transmitting a packet from the sender 21 to the receiver 31 and the receiver 32 is formed.

An identifier is assigned to the multicast group, and the identifier of the first multicast group is "51".

Figure 2:
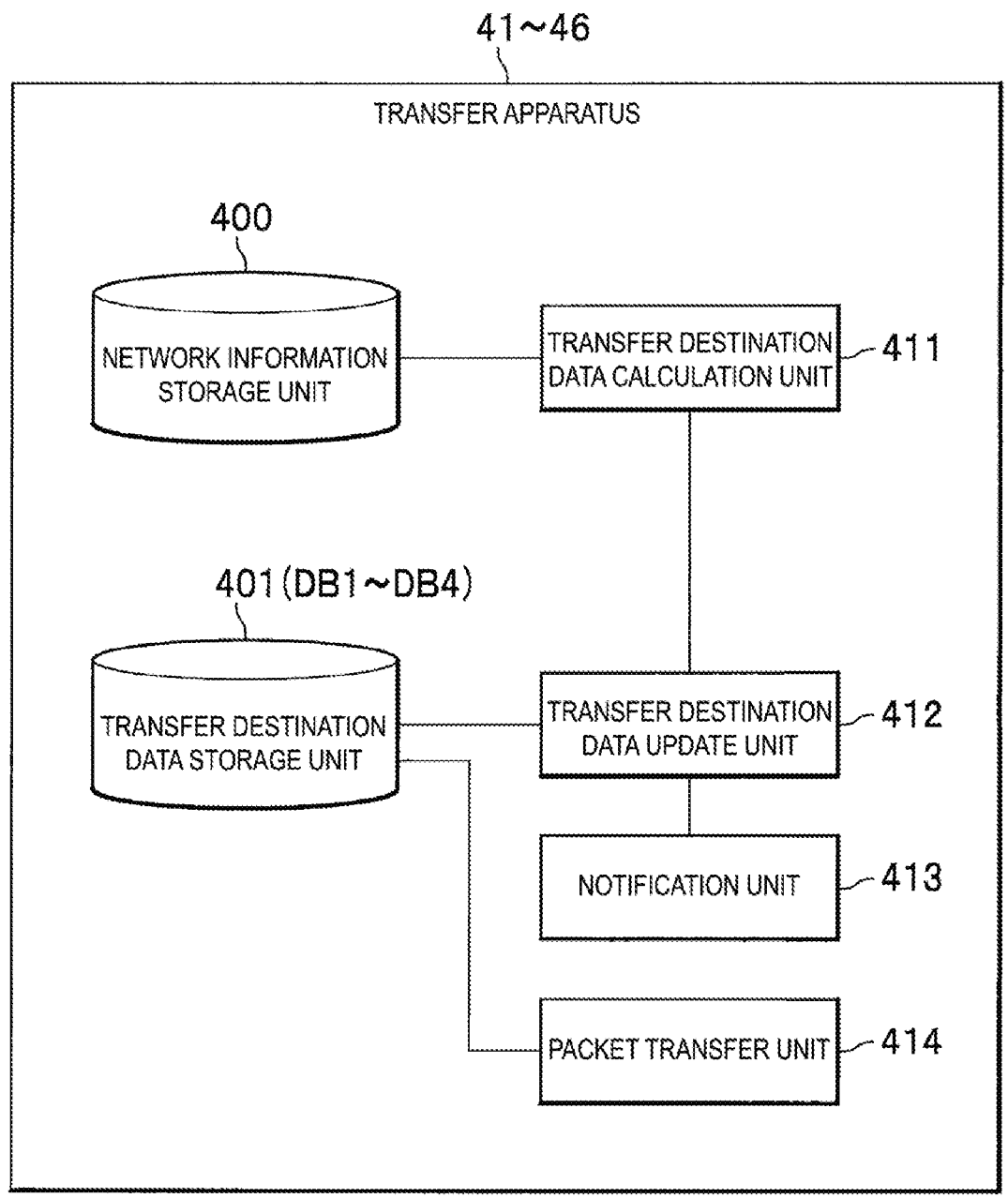
FIG. 2 is a block diagram illustrating a functional configuration of transfer apparatuses 41 to 46.

FIG. 2 is a block diagram illustrating a functional configuration of the transfer apparatuses 41 to 46.

The transfer apparatuses 41 to 46 include a network information storage unit 400, a transfer destination data storage unit 401 (DB1 to DB4), a transfer destination data calculation unit 411, a transfer destination data update unit 412, a notification unit 413, and a packet transfer unit 414.

The network information storage unit 400 stores the following information distributed to each apparatus in the multicast transfer system 10.

(A) Multicast group information: information in which a multicast group identifier is associated with identifiers of apparatuses serving as senders and receivers in the multicast group (B) Identifiers of the transfer apparatuses 41 to 46 and a connection relationship between the transfer apparatuses 41 to 46

The transfer destination data storage unit 401 (DB1 to DB4) is provided in the transfer apparatuses 41 to 44 except the transfer apparatuses 45 and 46 that are directly connected to receivers 31 and 32 (refer to FIG. 1). The transfer destination data storage unit 401 stores transfer destination data DB to DB4 for specifying a transfer destination of a packet at a time of multicast transfer.

Figure 3:
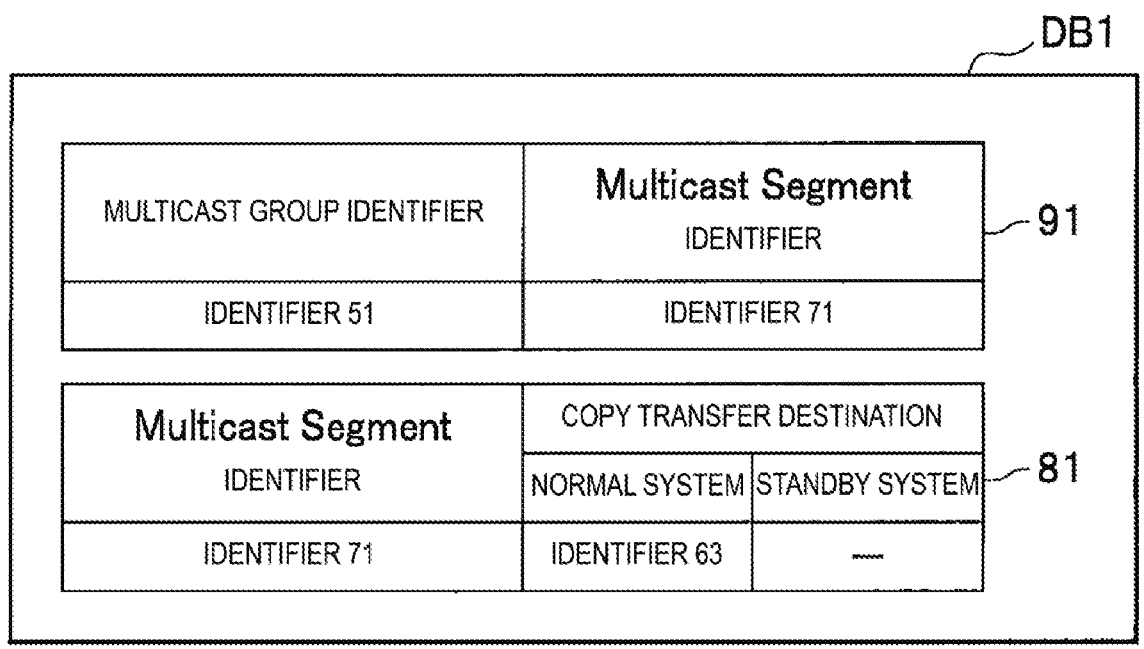
FIG. 3 is a table showing transfer destination data DB1 of the transfer apparatus 41.
Figure 4:
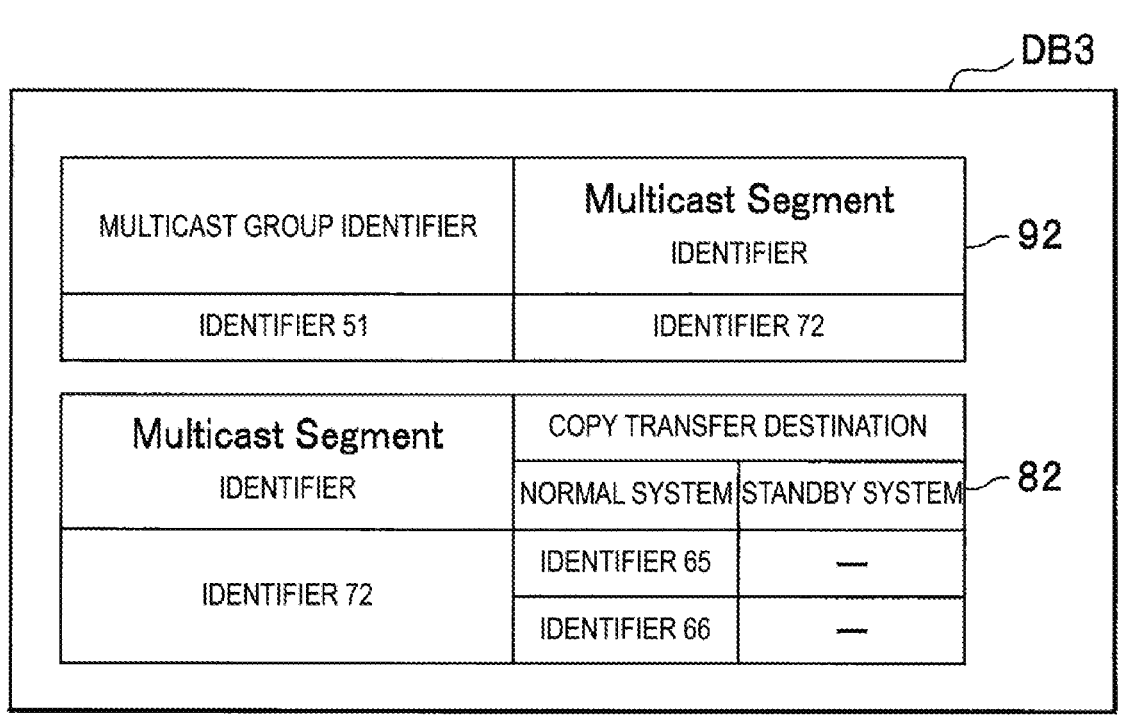
FIG. 4 is a table showing transfer destination data DB3 of the transfer apparatus 43.

FIG. 3 is a table showing the transfer destination data DB in the transfer destination data storage unit 401 of the transfer apparatus 41. FIG. 4 is a table showing the transfer destination data DB3 in the transfer destination data storage unit 401 of the transfer apparatus 43. In the transfer destination data DB1 and DB3, segment information 81 and 82 and group-classified transmission destination information 91 and 92 are recorded, respectively.

The segment information 81 and 82 defines a multicast segment in the transfer apparatus. For example, in the segment information 81 of the transfer destination data DB1 in FIG. 3, the transfer apparatus (transfer apparatus 43) having the identifier 63 is set as a multicast segment having an identifier 71. For example, in the segment information 82 of the transfer destination data DB3 in FIG. 4, the transfer apparatus (transfer apparatus 45) having the identifier 65 and the transfer apparatus (transfer apparatus 46) having the identifier 66 are set as the multicast segments having the identifier 72.

The group-classified transmission destination information 91 and 92 defines a multicast segment to which a packet addressed to a predetermined multicast group is to be transferred when the transfer apparatus (itself) receives the packet. For example, the group-classified transmission destination information 91 of the transfer destination data DB1 in FIG. 3 is set so that when a packet of the multicast group having the identifier 51 is received, the packet is transferred to the multicast segment having the identifier 71. Further, for example, the group-classified transmission destination information 92 of the transfer destination data DB3 in FIG. 4 is set so that when a packet of the multicast group having the identifier 51 is received, the packet is transferred to the multicast segment having the identifier 72.

That is, the transfer destination data storage unit 401 stores transfer destination data that associates a group identifier for identifying a multicast group with copy transfer destination information (segment information) for specifying another transfer apparatus to be used as a transfer destination of the packet when the transfer apparatus receives the packet.

A normal system and a standby system can be set as transfer destinations in each of the segment information 81 and 82. The packet transfer unit 414, which will be described later, transfers a multicast packet to a transfer destination set to the normal system at normal times, and transfers the multicast packet to a transfer destination set to the standby system when a failure occurs. In other words, the normal system has a higher priority than the standby system. Configuration may be taken so that it is possible to set a plurality of transfer apparatuses to be used as the standby system. In this case, the priorities may be further set for a plurality of transfer apparatuses of the standby system that have been set.

That is, a plurality of other transfer apparatuses can be registered in the copy transfer destination information (segment information) with priority added, and a plurality of group identifiers can be associated with a single copy transfer destination information (segment information) as described later.

Returning to the description of FIG. 2, the transfer destination data calculation unit 411 calculates transfer destination data held by another transfer apparatus in the multicast transfer system 10.

The transfer destination data calculation unit 411 computes a multicast transfer tree, which is a path through which the multicast packet circulates, using information (A) and (B) stored in the network information storage unit 400 and calculates transfer destination data in another transfer apparatus, that is, segment information (copy transfer destination information) and group-classified transmission destination information from the multicast transfer tree.

The transfer destination data update unit 412 refers to the transfer destination data of another transfer apparatus calculated by the transfer destination data calculation unit 411, sets a new multicast segment in transfer destination data of the transfer apparatus, and sets the group identifier in the new multicast segment.

That is, the transfer destination data update unit 412 newly sets a transfer apparatus to which the transfer apparatus can be connected to the copy transfer destination information (segment information) of the transfer destination data of the transfer apparatus when a transfer apparatus to which the transfer apparatus can be connected is set in the copy transfer destination information of the transfer destination data held by another transfer apparatus, and records the group identifier associated with the transfer apparatus to which the transfer apparatus can be connected in the transfer destination data held by the other transfer apparatus in association with copy transfer destination information with the newly set copy transfer destination information newly set copy.

Hereinafter, a specific example will be described.

For example, as shown in FIG. 4, in the segment information 82 (copy transfer destination information) of the transfer apparatus 43, the transfer apparatus (transfer apparatus 45) having the identifier 65 and the transfer apparatus (transfer apparatus 46) having the identifier 66 are set as the multicast segment having the identifier 72. On the other hand, as illustrated in FIG. 1, the transfer apparatus 44 can also be connected to the transfer apparatus (transfer apparatus 45) having the identifier 65 and the transfer apparatus (transfer apparatus 46) having the identifier 66.

Figure 5:
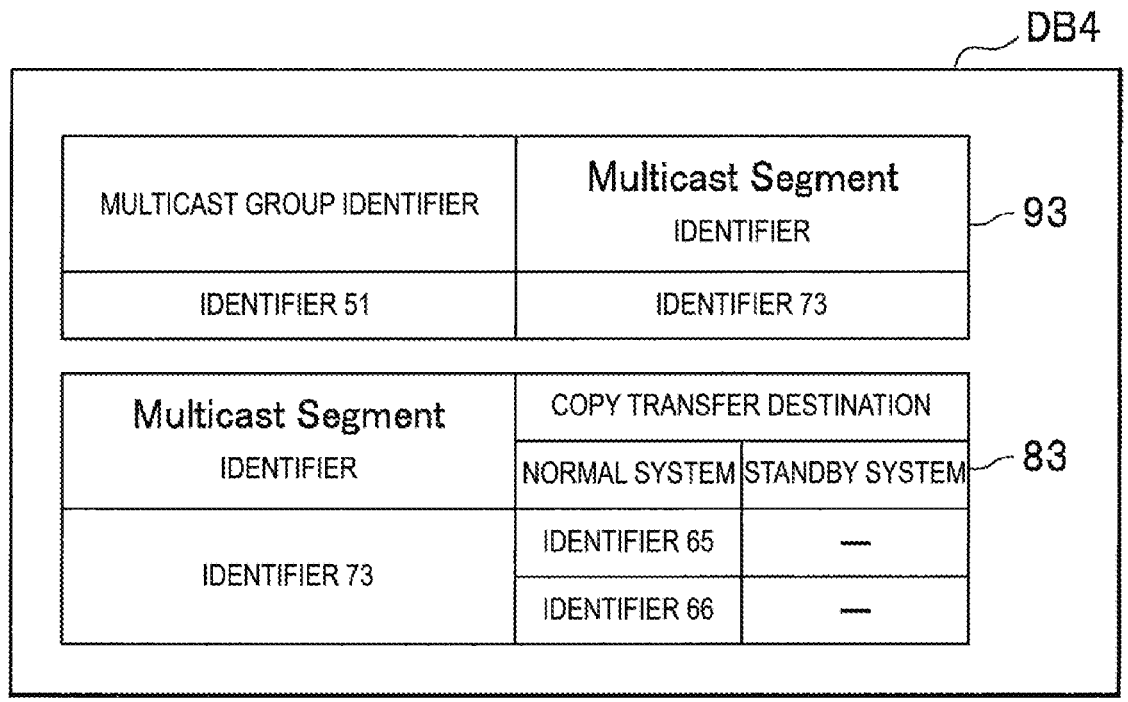
FIG. 5 is a table showing transfer destination data DB4 of the transfer apparatus 44.

The transfer destination data update unit 412 of the transfer apparatus 44 refers to the transfer destination data of another transfer apparatus (transfer apparatus 43) calculated by the transfer destination data calculation unit 411 of the transfer apparatus, and detects that the transfer apparatus (transfer apparatus 45) having the identifier 65 and the transfer apparatus (transfer apparatus 46) having the identifier 66 can also be set in the copy transfer destination of the transfer apparatus. Then, as shown in FIG. 5, the transfer apparatus (transfer apparatus 45) having the identifier 65 and the transfer apparatus (transfer apparatus 46) having the identifier 66 are set as the multicast segment having an identifier 73 in the segment information 83 of the transfer destination data DB4 of the transfer apparatus.

The transfer destination data update unit 412 further associates the identifier 51, which is a group identifier associated with the multicast segment having the identifier 72 in the transfer apparatus 43, with the group-classified transmission destination information 93 of the transfer destination data DB4 of the transfer apparatus.

As another method, when a multicast segment already set in the transfer destination data of the transfer apparatus is the same transfer destination as a multicast segment set in another transfer apparatus, the multicast segment may be diverted to be set as a standby system. That is, when the copy transfer destination information of the transfer destination data held by another transfer apparatus includes the same copy transfer destination information as the copy transfer destination information of the transfer destination data held by the transfer apparatus, the transfer destination data update unit 412 may record the group identifier associated with the same copy transfer destination information in the transfer destination data held by another transfer apparatus in the same copy transfer destination information of the transfer destination data of the transfer apparatus.

Hereinafter, a specific example will be described.

Figure 6:
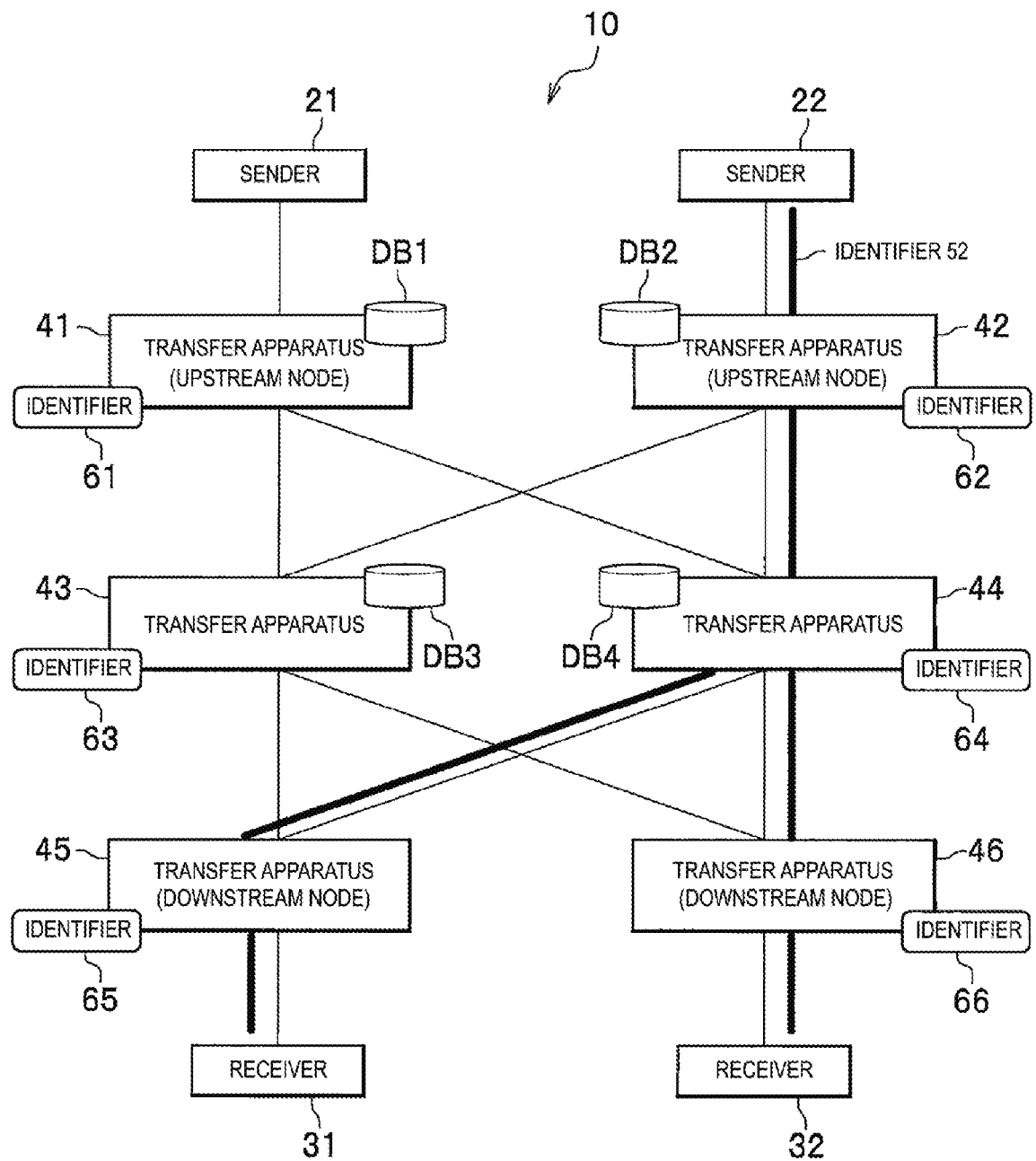
FIG. 6 is a diagram schematically illustrating a packet transfer path of a second multicast group.

For example, it is assumed that, in addition to the first multicast group having the identifier 51 described above, a second multicast group for transmitting packets from the sender 22 to the receivers 31 and 32 is formed as shown in FIG. 6. It is assumed that the identifier of the second multicast group is 52.

In this case, as shown in FIG. 7, in segment information 83a (copy transfer destination information) of the transfer apparatus 44 (transfer destination data DB4), the transfer apparatus (transfer apparatus 45) having the identifier 65 and the transfer apparatus (transfer apparatus 46) having the identifier 66 are set as the multicast segment having the identifier 73. The identifier 52 which is the identifier of the second multicast group is associated with the multicast segment having the identifier 73 in group-classified transmission destination information 93a of the transfer destination data DB4.

The transfer destination data update unit 412 of the transfer apparatus 44 detects that a multicast segment having the identifier 72 in which the transfer apparatus (transfer apparatus 45) having the identifier 65 and the transfer apparatus (transfer apparatus 46) having the identifier 66 are set is present in the transfer destination data of another transfer apparatus (transfer apparatus 43). That is, the transfer destination data update unit 412 detects that there is the same multicast segment (identifier 72) as the multicast segment (identifier 73) set in the transfer apparatus. Then, as shown in FIG. 8, the transfer destination data update unit 412 of the transfer apparatus 44 also associates the identifier 51, which is a group identifier associated with the multicast segment having the identifier 72 in another transfer apparatus (transfer apparatus 43), with the multicast segment having the identifier 73. That is, in the transfer destination data DB4 of the transfer apparatus 44, two (plural) group identifiers are associated with the multicast segment (single copy transfer destination information) having the identifier 73.

As such, when a copy transfer destination is set in a transfer apparatus, for which the same copy transfer destination as another transfer apparatus can be set, in advance to perform transfer by another multicast group, a computation load can be reduced by utilizing this information (multicast segment information computed in advance).

Returning to the description of FIG. 2, when the transfer destination data is updated based on the transfer destination data of another transfer apparatus (hereinafter, referred to as a "counterpart node"), the notification unit 413 notifies an upstream transfer apparatus (hereinafter, referred to as "upstream node") positioned upstream of the counterpart node of update information of the transfer destination data including the group identifier newly recorded.

Hereinafter, a specific example will be described.

For example, it is assumed that the transfer apparatus 44 (identifier 64) refers to the transfer destination data of the transfer apparatus 43 (identifier 63) and sets the multicast segment having the identifier 73 in the segment information 83 of the transfer destination data DB4 of the transfer apparatus as shown in FIG. 5, and the multicast group having the identifier 51 is associated with the multicast segment having the identifier 73 in the group-classified transmission destination information 93.

In this case, the counterpart node is the transfer apparatus 43, and the upstream node is the transfer apparatus 41 (identifier 61). The notification unit 413 of the transfer apparatus 44 notifies the transfer apparatus 41, which is the upstream node, of the update information. The update information includes the identifier (identifier 64) of the transfer apparatus 44 and the identifier (identifier 51) of the multicast group newly recorded in the group-classified transmission destination information 93.

When the transfer apparatus 41, which is the upstream node, receives the update information of the transfer apparatus 44, the transfer destination data update unit 412 extracts the identifier (identifier 51) of the multicast group included in the update information. Then, the multicast segment associated with the multicast group having the identifier 51 is determined based on the group-classified transmission destination information 91 in the transfer destination data DB1 of the transfer apparatus. When referring to FIG. 3, in the transfer destination data DB1, the multicast segment having the identifier 71 is associated with the multicast group having the identifier 51.

Figure 9:
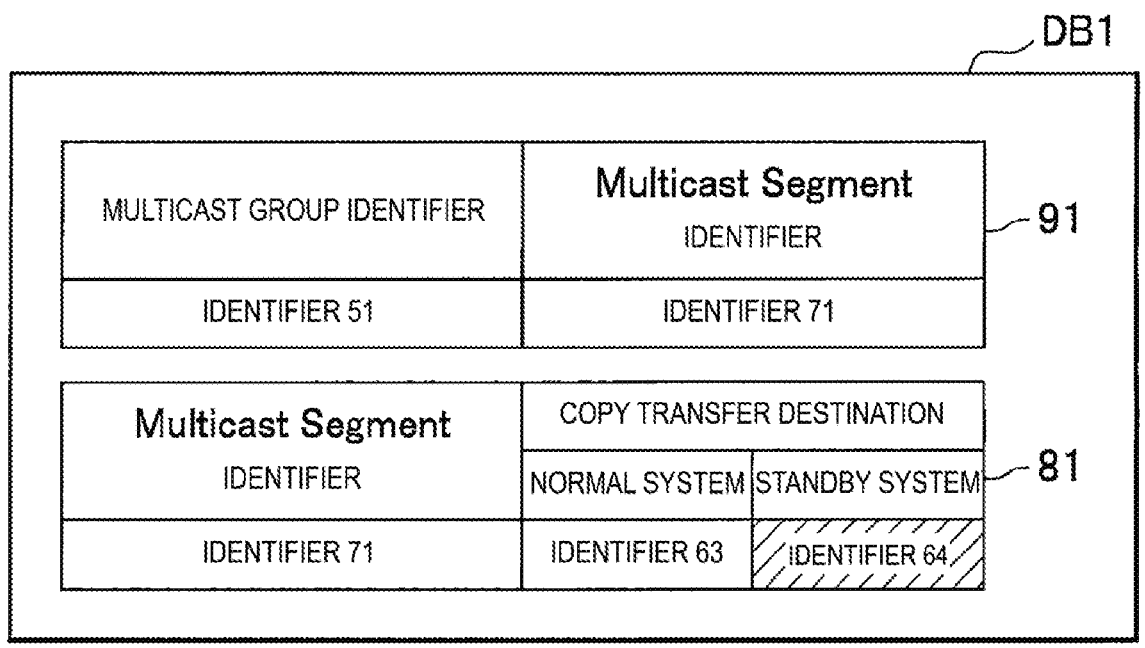
FIG. 9 is a table showing the transfer destination data DB1 of the transfer apparatus 41 after a change.

Then, the transfer destination data update unit 412 of the transfer apparatus 41 adds the identifier 64 of the transfer apparatus 44 (hatched portion in the figure) to the "standby system having the identifier 71" recorded in the segment information 81 as shown in FIG. 9. With this configuration, the transfer apparatus 44 is registered as a standby system of the copy transfer destination of the multicast segment having the identifier 71 associated with the multicast group having the identifier 51.

That is, when the update information including the group identifier is notified from the downstream transfer apparatus positioned downstream of the transfer apparatus, the transfer destination data update unit 412 of the upstream node adds the downstream transfer apparatus to the copy transfer destination information (segment information) associated with the group identifier in the transfer destination data of the transfer apparatus.

Although the transfer apparatus 43 and the transfer apparatus 44 are connected to the transfer apparatus 41 in parallel in the network configuration of FIG. 1, a plurality of transfer apparatuses may be connected to the transfer apparatus 41 in some cases. That is, a state in which a plurality of candidates can be set as the "standby system having the identifier 71" in the transfer apparatus 41 can also be considered. In such a case, a transfer apparatus to be used as the standby system is appropriately determined based on a priority in the network.

For example, when it is intended to minimize transfer performance degradation in multicast transfer due to switching to the standby system, matters such as that a transfer apparatus physically closest to the transfer apparatus (switching source node) of normal system is set as the standby system (or a priority order is set in a physically closer order) may be considered.

Returning to the description of FIG. 2, when a packet is received from an upstream apparatus (another transfer apparatus or sender), the packet transfer unit 414 determines a copy transfer destination of the packet based on the transfer destination data stored in the transfer destination data storage unit 401, and transfers the packet to the copy transfer destination. Specifically, for example, the packet transfer unit 414 of the transfer apparatus 41 determines a copy transfer destination of the packet using the transfer destination data DB1 illustrated in FIG. 9. When the transfer apparatus 41 receives the packet to which the identifier 51 is added, the packet transfer unit 414 transfers the packet to the multicast segment having the identifier 71 associated with the identifier 51.

Here, a normal system (transfer apparatus having the identifier 63) and a standby system (transfer apparatus having the identifier 64) are set in the multicast segment having the identifier 71.

The packet transfer unit 414 transfers the packet to the transfer destination of the normal system at the normal times, that is, the transfer apparatus having the identifier 63. For example, as illustrated in FIG. 1, when the packet with the identifier 51 added is transmitted from the sender 21, the transfer apparatus 41 transfers the packet to the transfer apparatus 43 having the identifier 63 set as the normal system in the transfer destination data DB of the transfer apparatus. The transfer apparatus 43 transfers the packet to the transfer apparatus 45 having the identifier 65 and the transfer apparatus 46 having the identifier 66 which are the multicast segments associated with the identifier 51 in the transfer destination data DB3 of the transfer apparatus. The transfer apparatus 45 having the identifier 65 and the transfer apparatus 46 having the identifier 66 are connected to the receiver 31 and the receiver 32, respectively, and transfer the received packets to the receivers, respectively.

For example, when a failure occurs in the transfer destination of the normal system, the packet is transferred to the transfer destination of the standby system, that is, the transfer apparatus having the identifier 64. In this case, when a plurality of transfer destinations are set in the standby system, the transfer destinations of the packets are determined in descending order of priority.

Figure 10:
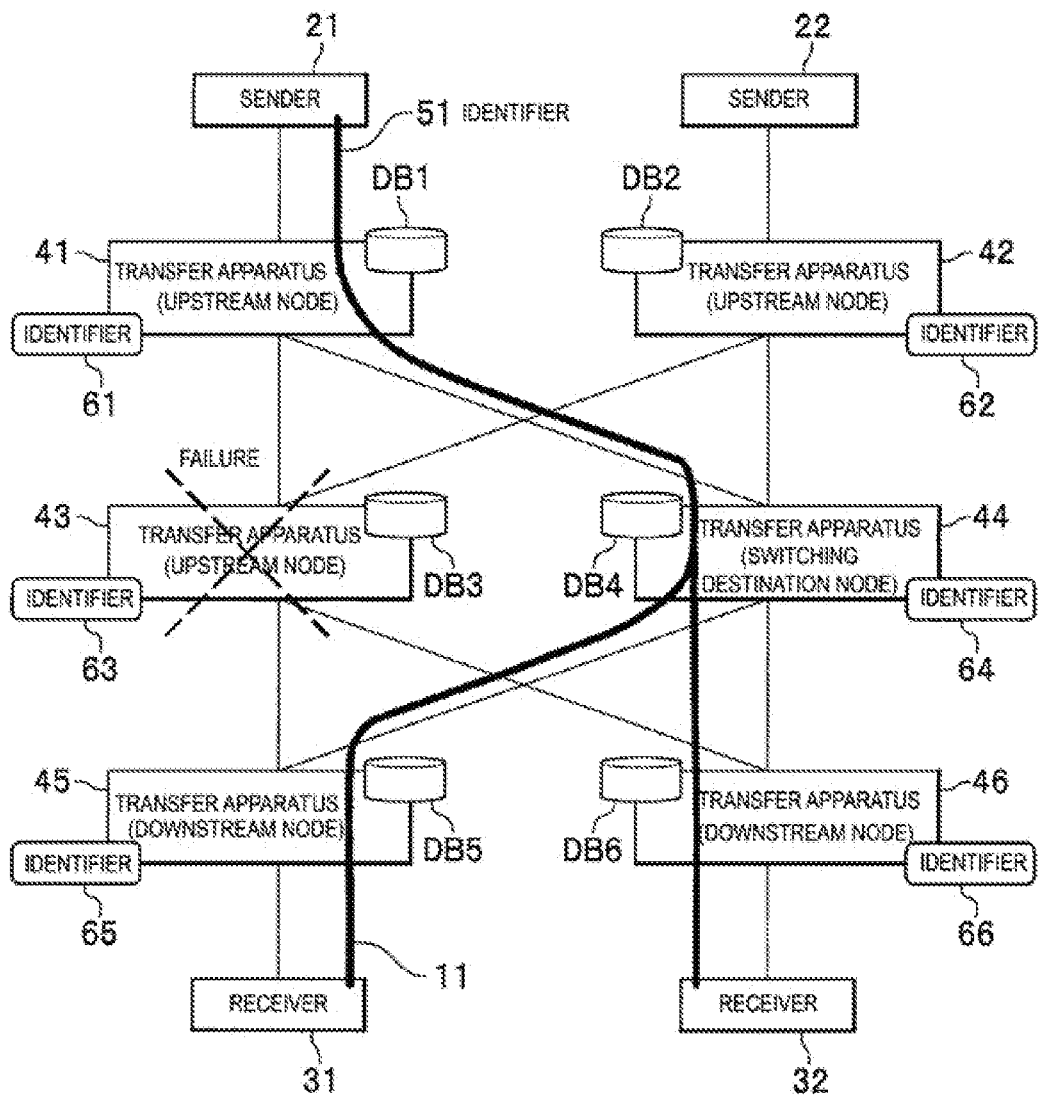
FIG. 10 is a diagram schematically illustrating a packet transfer path when a failure occurs.

For example, consider a case where a failure has occurred in the transfer apparatus 43 as illustrated in FIG. 10. In this case, the transfer apparatus 41, which is the upstream node of the transfer apparatus 43, detects a failure of the transfer apparatus 43 and immediately switches the transfer destination of the packet to the standby system. That is, when the packet with the identifier 51 added is transmitted from the sender 21, the transfer apparatus 41 transfers the packet to the transfer apparatus 44 having the identifier 64 set as the standby system in the transfer destination data DB1. The transfer apparatus 44 transfers the packet to the transfer apparatus 45 having the identifier 65 and the transfer apparatus 46 having the identifier 66 which are multicast segments associated with the identifier 51 in the transfer destination data DB4 of the transfer apparatus. Thereafter, the transfer apparatus 45 having the identifier 65 and the transfer apparatus 46 having the identifier 66 transfer the received packets to the receiver 31 and the receiver 32, respectively, similarly as in normal times. With this configuration, it is possible to perform a multicast transfer that avoids the transfer apparatus 43 in which the failure has occurred.

That is, when the packet transfer unit 414 receives a packet to which a group identifier is added from an upstream apparatus (another transfer apparatus or sender), the packet transfer unit 414 copies and transfers the packet to the transfer apparatus having the highest priority among transfer apparatuses in the transfer destination information associated with the group identifier in the transfer destination data. In the case of the example described above, the transfer apparatus of the normal system is the transfer apparatus having the highest priority.

When a failure is detected in the transfer apparatus having the highest priority, the packet transfer unit 414 copies and transfers the packet to the transfer apparatus having the next highest priority, as the copy transfer destination of the packet, among the transfer apparatuses in the copy transfer destination information. That is, when a failure occurs in the transfer apparatus of the normal system, the transfer destination is switched to the transfer apparatus of the standby system.

In the description described above, although the path switching at the time of failure has been described as an example, the present disclosure is also applicable to a case where a path is switched so that a specific transfer apparatus is avoided when a load is concentrated on the specific transfer apparatus. Also in this case, it is possible to explicitly avoid a specific transfer apparatus and distribute the load of multicast transfer. In contrast, in the related art, the switching source node exists on the shortest path between the upstream node and the downstream node and thus, even if the path switching used in the related art is performed, it is not possible to designate a path that avoids the switching source node.

When there is a plurality of transfer apparatuses for which the same copy transfer destination (multicast segment) can be set, a flexible path change in the multicast transfer becomes possible by explicitly switching the path between those transfer apparatuses. In contrast, in the related art, it is not possible to switch a path that deviates from the multicast transfer path computed in advance.

As described above, according to the multicast transfer system 10 according to the embodiment, even when a failure occurs in the transfer apparatus on the transfer path of the packet or when the load is concentrated on a specific transfer apparatus, it is possible to immediately switch the transfer destination to a standby system that is set in advance, to realize quick failure recovery, and to suppress an increase in bandwidth consumption in the network at the time of failure recovery.

REFERENCE SIGNS LIST 10 multicast transfer system
21, 22 sender (transmitting apparatus)
31, 32 receiver (receiving apparatus)
41 to 46 transfer apparatus
400 network information storage unit
401 transfer destination data storage unit
411 transfer destination data calculation unit
412 transfer destination data update unit
413 notification unit
414 packet transfer unit

The invention claimed is:

1. A multicast transfer system comprising a transmitting apparatus that transmits a packet; a receiving apparatus that receives the packet; and a plurality of transfer apparatuses that are disposed between the transmitting apparatus and the receiving apparatus and transfer the packet, a multicast group for transmitting the same packet from a single transmitting apparatus to a plurality of the receiving apparatuses being formed in the multicast transfer system, wherein each of the transfer apparatuses
holds transfer destination data that associates a group identifier for identifying the multicast group with copy transfer destination information that specifies another transfer apparatus to be used as a transfer destination of the packet when the packet is received; and
in the copy transfer destination information, a plurality of the other transfer apparatuses are allowed to be registered by adding a priority and a plurality of the group identifiers are allowed to be associated with a single piece of the copy transfer destination information; and
wherein each of the transfer apparatuses further includes
a packet transfer unit, including one or more processors, configured to, when the packet to which the group identifier is added is received, transfer the packet to a transfer apparatus having a highest priority among transfer apparatuses in the copy transfer destination information associated with the group identifier in the transfer destination data; and
when a failure is detected in the transfer apparatus having the highest priority, the packet transfer unit transfers the packet to a transfer apparatus having a next highest priority among the transfer apparatuses in the copy transfer destination information, as the copy transfer destination of the packet.

2. The multicast transfer system according to claim 1, wherein each of the transfer apparatuses includes
a transfer destination data calculation unit, including one or more processors, configured to calculate the transfer destination data held by the other transfer apparatus in the multicast transfer system;
a transfer destination data update unit, including one or more processors, configured to newly set a transfer apparatus to which the transfer apparatus is allowed to be connected to the copy transfer destination information of the transfer destination data of the transfer apparatus when the transfer apparatus to which the transfer apparatus is allowed to be connected is set in the copy transfer destination information of the transfer destination data held by the other transfer apparatus, and records the group identifier associated with the transfer apparatus to which the transfer apparatus is allowed to be connected in the transfer destination data held by the other transfer apparatus in association with the newly set copy transfer destination information; and
a notification unit, including one or more processors, configured to notify an upstream transfer apparatus positioned upstream of the other transfer apparatus of update information of the transfer destination data including the group identifier newly recorded; and the transfer destination data update unit, including one or more processors, adds a downstream transfer apparatus positioned downstream of the transfer apparatus to the copy transfer destination information associated with the group identifier in the transfer destination data of the transfer apparatus when a notification of the update information is given from the downstream transfer apparatus.

3. The multicast transfer system according to claim 2, wherein when the copy transfer destination information of the transfer destination data held by the other transfer apparatus includes the same copy transfer destination information as the copy transfer destination information of the transfer destination data held by the transfer apparatus, the transfer destination data update unit records the group identifier associated with the same copy transfer destination information in the transfer destination data held by the other transfer apparatus in the same copy transfer destination information of the transfer destination data of the transfer apparatus.

4. A multicast transfer method in a multicast transfer system including a transmitting apparatus configured to transmit a packet, a receiving apparatus configured to receive the packet, and a plurality of transfer apparatuses that are disposed between the transmitting apparatus and the receiving apparatus and transfer the packet, a multicast group for transmitting the same packet from a single transmitting apparatus to a plurality of the receiving apparatuses being formed in the multicast transfer system, the method comprising:

by each of the transfer apparatuses,
holding transfer destination data that associates a group identifier for identifying the multicast group with copy transfer destination information that specifies another transfer apparatus to be used as a transfer destination of the packet when the packet is received;
in the copy transfer destination information, allowing a plurality of the other transfer apparatuses to be registered by adding a priority and allowing a plurality of the group identifiers to be associated with a single piece of the copy transfer destination information; and
executing a packet transfer for, when the packet is received, transferring the packet to a transfer apparatus having a highest priority among transfer apparatuses in the copy transfer destination information associated with the group identifier in the transfer destination data
wherein, in the executing the packet transfer, when a failure is detected in the transfer apparatus having the highest priority, the packet is transferred to a transfer apparatus having a next highest priority among the transfer apparatuses in the copy transfer destination information, as the copy transfer destination of the packet.

5. The multicast transfer method according to claim 4, further comprising:

at each of the transfer apparatuses,
executing a transfer destination data calculation for calculating the transfer destination data held by the other transfer apparatus in the multicast transfer system;
executing a first transfer destination data update for newly setting a transfer apparatus to which the transfer apparatus is allowed to be connected to the copy transfer destination information of the transfer destination data of the transfer apparatus when the transfer apparatus to which the transfer apparatus is allowed to be connected is set in the copy transfer destination information of the transfer destination data held by the other transfer apparatus, and recording the group identifier associated with the transfer apparatus to which the transfer apparatus is allowed to be connected in the transfer destination data held by the other transfer apparatus in association with the newly set copy transfer destination information; and
executing a notification for notifying an upstream transfer apparatus positioned upstream of the other transfer apparatus of update information of the transfer destination data including the group identifier newly recorded; and at the upstream transfer apparatus,
executing a second transfer destination data update for adding a downstream transfer apparatus positioned downstream of the transfer apparatus to the copy transfer destination information associated with the group identifier in the transfer destination data of the transfer apparatus when a notification of the update information is given from the downstream transfer apparatus.

6. The multicast transfer method according to claim 5, wherein, in the executing the first transfer destination data update,
when the copy transfer destination information of the transfer destination data held by the other transfer apparatus includes the same copy transfer destination information as the copy transfer destination information of the transfer destination data held by the transfer apparatus, the first transfer destination data update execution records the group identifier associated with the same copy transfer destination information in the transfer destination data held by the other transfer apparatus in the same copy transfer destination information of the transfer destination data of the transfer apparatus.

* * * * *